(12) United States Patent
Sugiura et al.

(10) Patent No.: US 7,846,613 B2
(45) Date of Patent: Dec. 7, 2010

(54) FUEL CELL WITH SEPARATOR HAVING A RIDGE MEMBER

(75) Inventors: Seiji Sugiura, Utsunomiya (JP); Shuhei Goto, Utsunomiya (JP); Narutoshi Sugita, Utsunomiya (JP); Hiroyuki Tanaka, Utsunomiya (JP); Tadashi Nishiyama, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 1085 days.

(21) Appl. No.: 11/014,469

(22) Filed: Dec. 15, 2004

(65) Prior Publication Data
US 2005/0136306 A1    Jun. 23, 2005

(30) Foreign Application Priority Data
Dec. 22, 2003    (JP)    ............................. 2003-425309

(51) Int. Cl.
H01M 8/02    (2006.01)
(52) U.S. Cl. ................. 429/514; 429/512; 429/458
(58) Field of Classification Search ............. 429/37, 429/30, 26, 35, 514, 458, 512
See application file for complete search history.

(56) References Cited
U.S. PATENT DOCUMENTS

| | | | |
|---|---|---|---|
| 5,472,801 | A | 12/1995 | Mattejat et al. |
| 6,322,919 | B1 | 11/2001 | Yang et al. |
| 6,872,483 | B2 | 3/2005 | Sugiura et al. |
| 7,022,430 | B2 | 4/2006 | Enjoji et al. |
| 7,195,837 | B2 | 3/2007 | Suzuki et al. |
| 2002/0102453 | A1* | 8/2002 | Suenaga et al. ............... 429/37 |
| 2002/0127461 | A1* | 9/2002 | Sugita et al. .................. 429/35 |
| 2003/0087140 | A1* | 5/2003 | Kikuchi et al. ................ 429/26 |

FOREIGN PATENT DOCUMENTS

| | | |
|---|---|---|
| CN | 1378710 | 11/2002 |
| DE | 10015360 A1 | 10/2001 |
| DE | 10300068 A1 | 8/2003 |
| EP | 1009051 A2 | 6/2000 |
| JP | 08-222237 | 8/1996 |
| JP | 2001-110434 | 4/2001 |

(Continued)

OTHER PUBLICATIONS

Chinese Patent Publication No. CN 1311580C, dated Apr. 18, 2007 (front page).

(Continued)

Primary Examiner—Dah-Wei D Yuan
Assistant Examiner—Zachary Best
(74) Attorney, Agent, or Firm—Lahive & Cockfield, LLP; Anthony A. Laurentano

(57) ABSTRACT

A power generation cell includes a membrane electrode assembly and first and second metal separators sandwiching the membrane electrode assembly. Ridge members are formed integrally on the second metal separator, and these ridge members contact a first seal member of the first metal separator under pressure to form an inlet connection channel and an outlet connection channel. The coolant supply passage and the coolant flow field are connected through the inlet connection channel and the coolant discharge passage and the coolant flow field are connected through the outlet connection channel.

5 Claims, 7 Drawing Sheets

FOREIGN PATENT DOCUMENTS

| | | |
|---|---|---|
| JP | 2002-075395 | 3/2002 |
| JP | 2002-83610 | 3/2002 |
| JP | 2002-367665 | 12/2002 |
| JP | 2003-338300 | 11/2003 |
| WO | WO-03/092107 A1 | 11/2003 |

OTHER PUBLICATIONS

Japanese Office Action for Application No. 2003-425309, dated Sep. 25, 2007.

German Office Action for Application No. 102004058730.2, dated Apr. 23, 2010.

* cited by examiner

FUEL CELL WITH SEPARATOR HAVING A RIDGE MEMBER

BACKGROUND OF THE INVENTION

1. Field of the Invention

The present invention relates to a fuel cell formed by stacking a plurality of power generation cells in a stacking direction. The power generation cell includes a membrane electrode assembly, and a pair of metal separators sandwiching the membrane electrode assembly. The membrane electrode assembly includes a pair of electrodes and an electrolyte membrane interposed between the electrodes. A reactant gas passage and a coolant passage extend through the power generation cells in the stacking direction. Further, a coolant flow field for supplying a coolant is formed between metal separators of adjacent power generation cells.

2. Description of the Related Art

For example, a solid polymer fuel cell employs a membrane electrode assembly (MEA) which includes an anode and a cathode, and an electrolyte membrane interposed between the anode and the cathode. The electrolyte membrane is a polymer ion exchange membrane. The membrane electrode assembly and separators sandwiching the membrane electrode assembly make up a unit of a power generation cell for generating electricity. In use, generally, a predetermined number of power generation cells are stacked together to form a fuel cell stack.

In the power generation cell, a fuel gas such as a gas chiefly containing hydrogen (hereinafter also referred to as the hydrogen-containing gas) is supplied to the anode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electric current. A gas chiefly containing oxygen or air (hereinafter also referred to as the oxygen-containing gas) is supplied to the cathode. At the cathode, the hydrogen ions from the anode combine with the electrons and oxygen to produce water.

In the power generation cell, a fuel gas flow field (reactant gas flow field) and an oxygen-containing gas flow field (reactant gas flow field) are formed in surfaces of the separators. The fuel gas flow field is formed on a surface of the separator facing the anode for supplying the fuel gas to the anode, and the oxygen-containing gas flow field is formed on a surface of the separator facing the cathode for supplying the oxygen-containing gas to the cathode. Further, a coolant flow field is formed between the power generation cells for allowing a coolant to flow along surfaces of the separators.

The separator may be made of a thin metal plate having corrugated surfaces fabricated by pressure forming for achieving reduction of the fabrication cost and the size. In this case, the reactant gas flow field and the coolant flow field are formed on both surfaces of the separator. The shape of the reactant gas flow field formed on one surface of the separator constrains the shape of the coolant flow field formed on the other surface of the separator. Therefore, it may not be possible to fabricate the desired shape of the coolant flow field.

In particular, in an internal manifold type fuel cell in which the reactant gas passages and the coolant passages extend through the outer region of the metal separators in the stacking direction, the coolant may not flow suitably between the coolant flow field and the coolant passages.

In an attempt to address the problem, as shown in FIG. 7, Japanese Laid-Open Patent Publication 6-218275 discloses a fuel cell block 1 formed by stacking membrane electrode assemblies 2 and separators 3 alternately. The membrane electrode assembly 2 includes a cathode 5a, an anode 5b, and an electrolyte membrane 4 interposed between the cathode 5a and the anode 5b. Each of the membrane electrode assemblies 2 is sandwiched between the separators 3, and contact plates 6 are provided between the membrane electrode assemblies 2 and the separators 3.

Each of the separators 3 includes plates 3a, 3b which are stacked together. Ridges of the plates 3a, 3b contact each other to form a cooling water chamber 7 between the plates 3a, 3b.

A cooling water passage 8 extends through the fuel cell block 1 in the stacking direction indicated by an arrow X. The passage 8 is sealed by packings 9. The passage 8 is connected to the chamber 7 through an opening 7a in each of the separators 3. Therefore, in each of the separators 3, the cooling water supplied to the passage 8 flows from the opening 7a to the chamber 7. When the cooling water flows through the chamber 7, the cooling water cools the respective membrane electrode assemblies 2.

In Japanese Laid-Open Patent Publication No. 6-218275, the plates 3a, 3b of the separator 3 are made of thin plates. The chamber 7 connected to the opening 7a is formed between the plates 3a, 3b. Therefore, when a tightening load is applied to the fuel cell block 1 in the stacking direction, the plates 3a, 3b are deformed easily due to the opening 7a. Thus, it is difficult to suitably supply the cooling water to the chamber 7, and the sealing characteristics for preventing leakage of the reactant gases and the cooling water are lowered.

SUMMARY OF THE INVENTION

A main of the present invention is to provide a fuel cell having a simple structure in which it is possible to smoothly supply a coolant between metal separators for cooling power generation cells without any constraints by the shapes of reactant gas flow fields, and it is possible to maintain the desired power generation performance.

According to the present invention, a fuel cell is formed by stacking a plurality of power generation cells in a stacking direction. Each of the power generation cells includes a membrane electrode assembly and a pair of metal separators sandwiching the membrane electrode assembly. The membrane electrode assembly includes a pair of electrodes and an electrolyte membrane interposed between the electrodes. A reactant gas passage and a coolant passage extend through the power generation cells in a stacking direction, and a coolant flow field for supplying a coolant is formed between metal separators of adjacent power generation cells.

At least one of the metal separators has a ridge member formed integrally on a surface opposite to the membrane electrode assembly, and the ridge member forms a connection channel connecting the coolant flow field and the coolant passage.

It is preferable that a connection channel is formed between the ridge member and a planar seal member formed integrally on the metal separator facing at least one of the metal separators. It is also preferable that the least one of metal separators includes a seal member on a surface opposite to the ridge member for preventing leakage in the membrane electrode assembly, part of the ridge member forming the connection channel is overlapped with at least part of the seal member in the stacking direction. It is also preferable that a seal member is formed integrally on the at least one of metal separators around the coolant flow field, and the ridge member forms part of the seal member.

Further, it is preferable that the power generation cells are stacked in a horizontal direction, the reactant gas passage comprises a fuel gas supply passage, an oxygen-containing gas supply passage, a fuel gas discharge passage, and an oxygen-containing gas discharge passage, the coolant passage comprises a coolant supply passage and a coolant discharge passage, and among six passages comprising the fuel gas supply passage, the oxygen-containing gas supply passage, the coolant supply passage, the fuel gas discharge passage, the oxygen-containing gas discharge passage, and the coolant discharge passage, three passages extend through a left end of the power generation cells, the other three passages extend through a right end of the power generation cells, and the coolant supply passage and the coolant discharge passage extend through middle portions of the opposite left and right ends of the power generation cells.

Further, it is preferable that the connection channel includes a plurality of bifurcated grooves bifurcated at least in two directions between the coolant passage and the coolant flow field.

According to the present invention, the ridge members formed integrally on the metal separator form the connection channels. Thus, the number of components of the fuel cell is reduced. With the simple structure, it is possible to reliably connect the coolant passages and the coolant flow field. Therefore, the coolant flows smoothly and suitably between the coolant passages and the coolant flow field regardless of the shapes of the reactant gas flow fields.

Further, the connection channel is formed between the ridge member and the planar seal member formed integrally on the metal separator. Thus, even if the position of the ridge member is displaced, it is possible to reliably form the connection channel.

Further, the ridge members contact the first seal member of the other metal separator. Thus, when a tightening load is applied to the fuel cell in the stacking direction, it is possible to effectively cool the power generation cell without deformation of the connection channel.

Further, the ridge member is overlapped with at least part of the seal member for preventing leakage in the membrane electrode assembly. Thus, a reaction force against the sealing load applied to the membrane electrode assembly is generated, and it is possible to suitably maintain the sealing characteristics of the membrane electrode assembly by the seal member.

Further, the coolant supply passage and the coolant discharge passage are provided at middle positions of the opposite left and right ends of the power generation cell. A plurality of bifurcated grooves of the connection channels are connected to the coolant supply passage and the coolant discharge passage. Thus, it is possible to smoothly and reliably supply the coolant to the entire coolant flow field.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
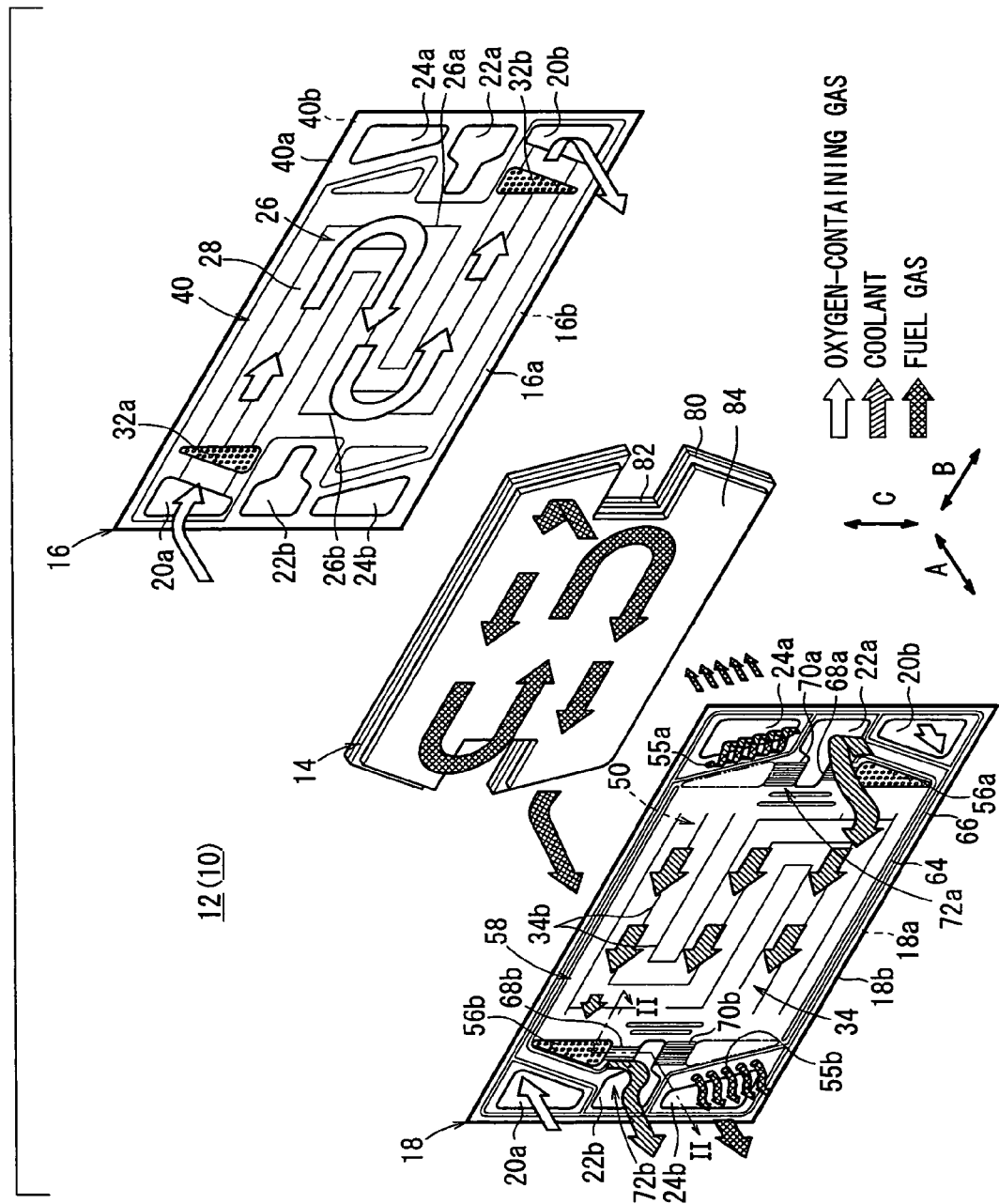
FIG. 1 is an exploded perspective view showing main components of a power generation cell of a fuel cell according to an embodiment of the present invention.
Figure 2:
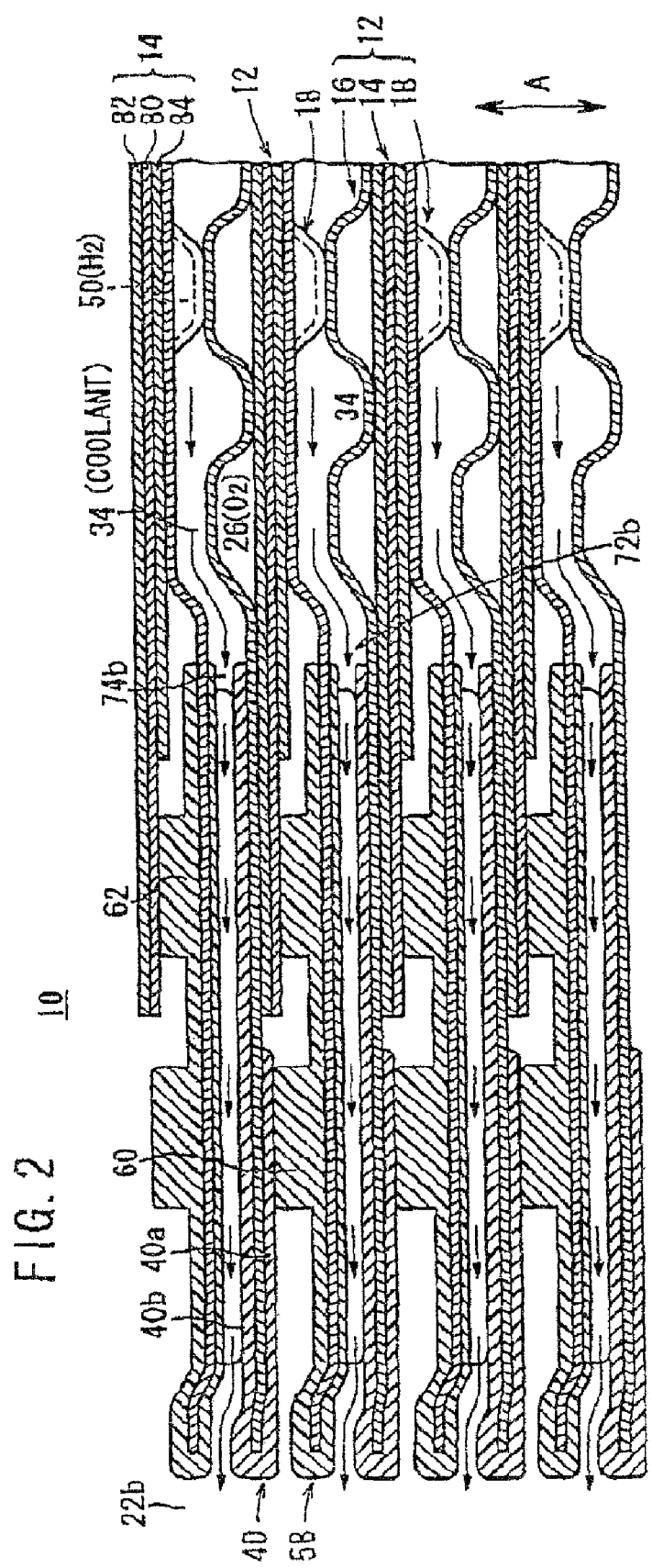
FIG. 2 is a cross sectional view showing the fuel cell taken along a line II-II in FIG. 1.

FIG. 1 is an exploded perspective view showing main components of a power generation cell 12 of a fuel cell 10 according to an embodiment of the present invention. FIG. 2 is a cross sectional view taken along a line II-II in FIG. 1, showing the fuel cell 10 formed by stacking a plurality of the power generation cells 12 horizontally in a direction indicated by an arrow A.

As shown in FIG. 1, the power generation cell 12 is formed by sandwiching a membrane electrode assembly 14 between the first and second metal separators 16, 18. For example, the first and second metal separators 16, 18 are thin metal plates such as steel plates, stainless steel plates, aluminum plates, or plated steel plates.

At one end of the power generation cell 12 in a horizontal direction indicated by an arrow B in FIG. 1, an oxygen-containing gas supply passage 20a for supplying an oxygen-containing gas, a coolant discharge passage 22b for discharging a coolant, and a fuel gas discharge passage 24b for discharging a fuel gas such as a hydrogen-containing gas are arranged vertically in a direction indicated by an arrow C. The oxygen-containing gas supply passage 20a, the coolant discharge passage 22b, and the fuel gas discharge passage 24b extend through the power generation cell 12 in the stacking direction indicated by the arrow A.

At the other end of the power generation cell 12 in the direction indicated by the arrow B, a fuel gas supply passage 24a for supplying the fuel gas, a coolant supply passage 22a for supplying the coolant, and an oxygen-containing gas discharge passage 20b for discharging the oxygen-containing gas are arranged in the direction indicated by the arrow C. The fuel gas supply passage 24a, the coolant supply passage 22a, and the oxygen-containing gas discharge passage 20b extend through the power generation cell 12 in the direction indicated by the arrow A.

The first metal separator 16 has an oxygen-containing gas flow field 26 on its surface 16a facing the membrane electrode assembly 14. For example, the oxygen-containing gas flow field 26 has a serpentine pattern including two turn regions and three straight regions for allowing the oxygen-containing gas to flow back and forth in the direction indicated by the arrow B. The oxygen-containing gas flow field 26 includes a plurality of grooves 28 formed by corrugating the first metal separator 16. The oxygen-containing gas flow field 26 is connected to the oxygen-containing gas supply passage 20a through an inlet buffer 32a and connected to the oxygen-containing gas discharge passage 20b through an outlet buffer 32b. For example, the inlet buffer 32a and the outlet buffer 32b are formed by making bosses or dimples in the first metal separator 16.

Figure 3:
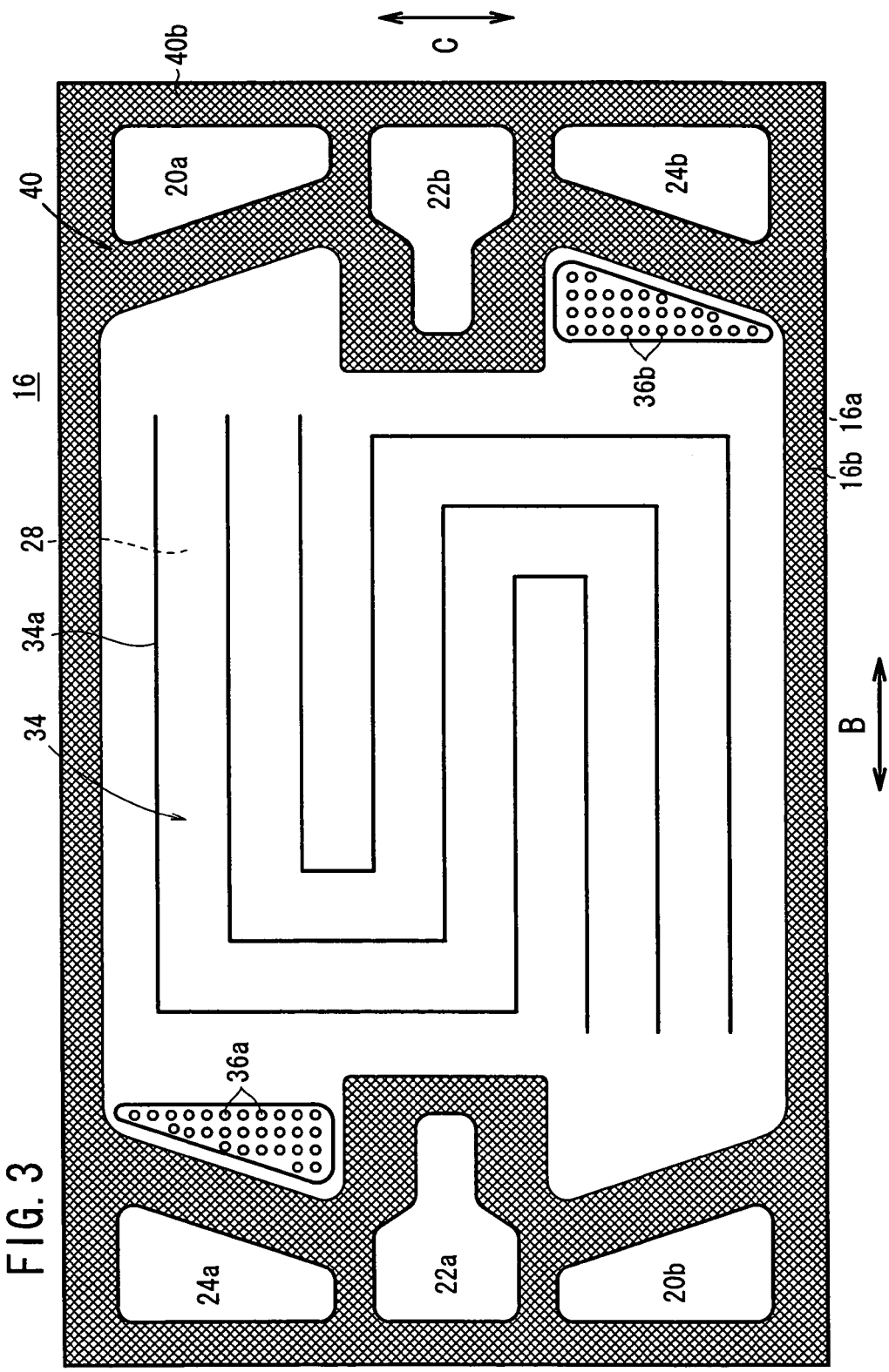
FIG. 3 is a front view showing a first metal separator of the power generation cell.

As shown in FIG. 3, the first metal separator 16 has grooves 34a on the other surface 16b as part of a coolant flow field 34 corresponding to the shape of the oxygen-containing gas flow field 26. The grooves 34a are connected to the coolant supply passage 22a and the coolant discharge passage 22b through the inlet buffer 36a and the outlet buffer 36b formed by bosses, for example.

A first seal member 40 is formed integrally on the surfaces 16a, 16b of the first metal separator 16 to cover (sandwich) the outer edge of the first metal separator 16, e.g., by heat treatment or injection molding. The first seal member 40 is made of seal material, cushion material or packing material such as EPDM (Ethylene Propylene Diene Monomer), NBR (Nitrile Butadiene Rubber), fluoro rubber, silicon rubber, fluoro silicon rubber, butyl rubber (Isobutene-Isoprene Rubber), natural rubber, styrene rubber, chloroprene rubber, or acrylic rubber.

The first seal member 40 has a planar shape. The first seal member 40 includes a first planar seal 40a on the surface 16a shown in FIG. 1 and a second planar seal 40b on the surface 16b shown in FIG. 3. The first planar seal 40a is not formed between the oxygen-containing gas flow field 26 and the oxygen-containing gas supply passage 20a, and between the oxygen-containing gas flow field 26 and the oxygen-containing gas discharge passage 20b. Therefore, the oxygen-containing gas flow field 26 is connected to the oxygen-containing gas supply passage 20a and the oxygen-containing gas discharge passage 20b. The second planar seal 40b is longer than the first planar seal 40a (see FIG. 2).

Figure 4:
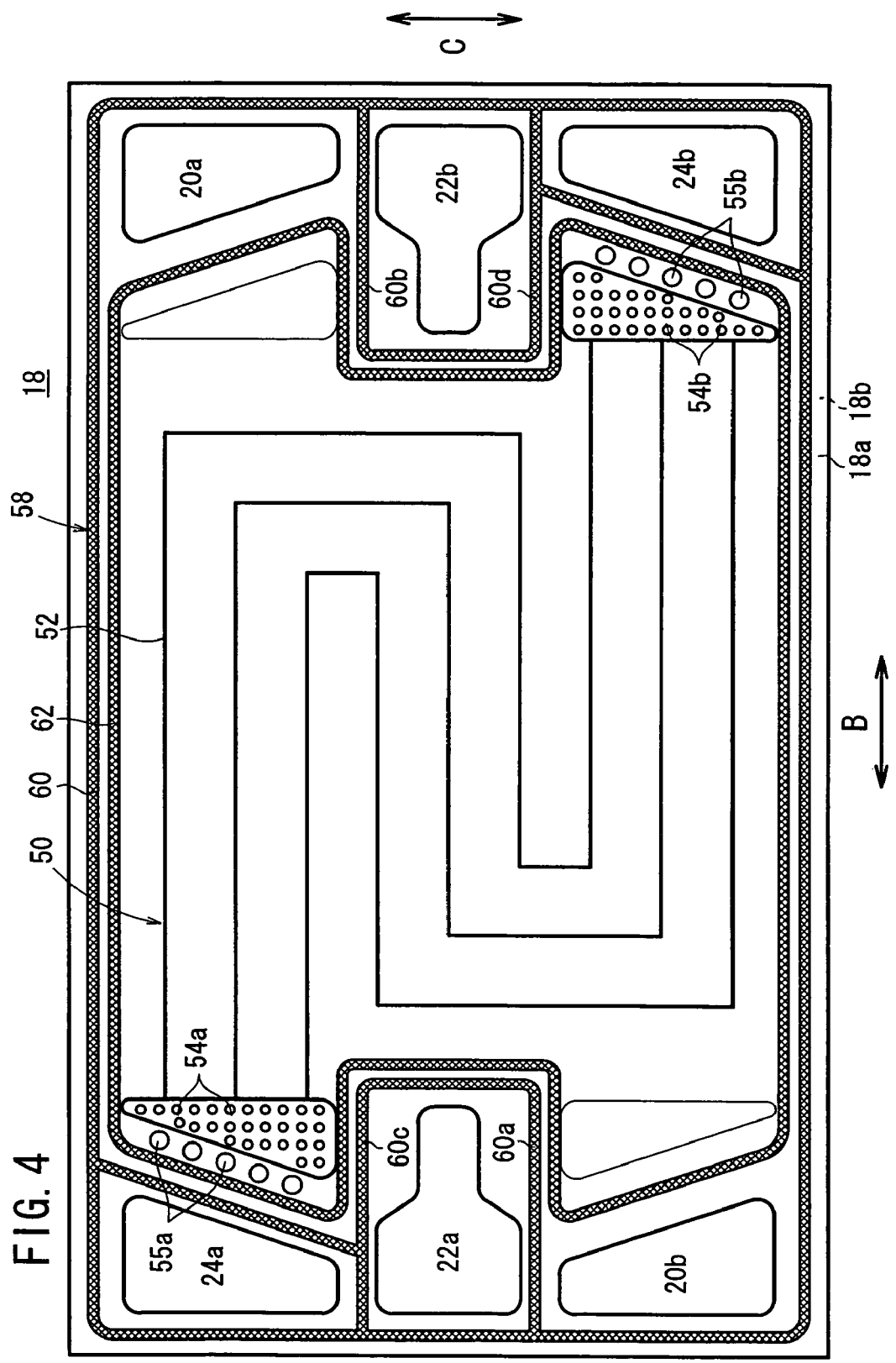
FIG. 4 is a front view showing one surface of a second metal separator of the power generation cell.

As shown in FIG. 4, the second metal separator 18 has a fuel gas flow field 50 on its surface 18a facing the membrane electrode assembly 14. For example, the fuel gas flow field 50 has a serpentine pattern including two turn regions and three straight regions for allowing the fuel gas to flow back and forth in the direction indicated by the arrow B. The fuel gas flow field 50 includes a plurality of grooves 52 formed by corrugating the second metal separator 18. The fuel gas flow field 50 is connected to the fuel gas supply passage 24a through an inlet buffer 54a and inlet through holes 55a, and connected to the fuel gas discharge passage 24b through an outlet buffer 54b and outlet through holes 55b. The inlet through hole 55a are connected to the fuel gas supply passage 24a on the surface 18b, and the outlet through holes are connected to the fuel gas discharge passage 24b on the surface 18b.

Figure 5:
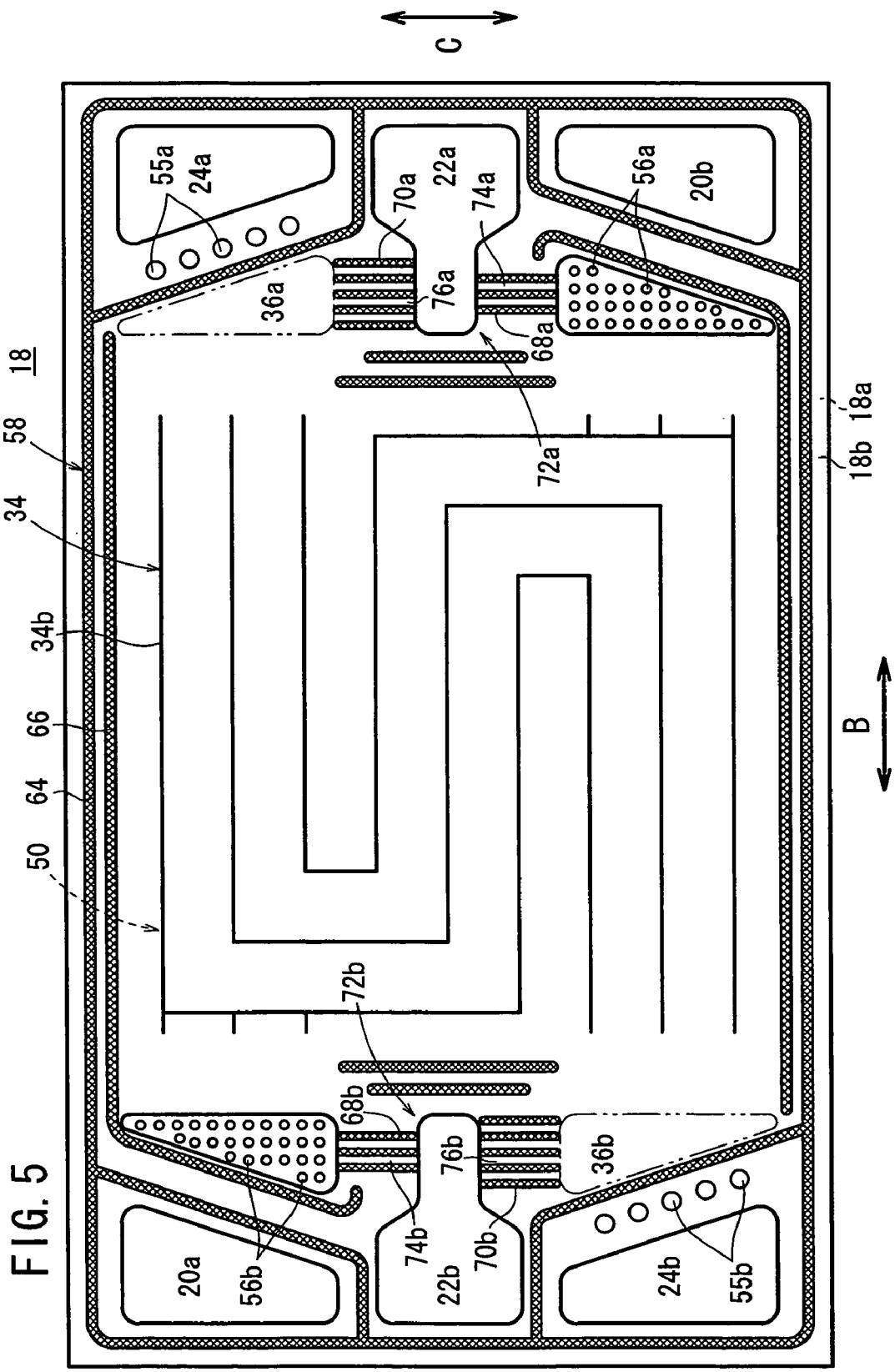
FIG. 5 is a front view showing the other surface of the second metal separator.

As shown in FIGS. 1 and 5, the second metal separator 18 has grooves 34b on its surface 18b opposite to the surface 18a, as part of the coolant flow field 34 corresponding to the shape of the fuel gas flow field 50. The grooves 34b are connected to the coolant supply passage 22a through an inlet buffer 56a and connected to the coolant discharge passage 22b through an outlet buffer 56b.

A second seal member 58 is formed integrally on the surfaces 18a, 18b of the second metal separator 18 to cover (sandwich) the outer edge of the second metal separator 18. The second seal member 58 and the first seal member 40 are made of the same material. As shown in FIG. 4, the second seal member 58 includes an outer protrusion 60 and an inner protrusion 62 formed on the surface 18a of the second metal separator 18. The inner protrusion 62 is spaced internally from the outer protrusion 60 by a predetermined distance. The inner protrusion 62 contacts the outer edge of a solid polymer electrolyte membrane 80 as described later, and closes the fuel gas flow field 50 (see FIG. 2).

As shown in FIG. 5, the second seal member 58 includes an outer protrusion 64 and an inner protrusion 66 formed on the surface 18b of the second metal separator 18. The inner protrusion 66 is spaced internally from the outer protrusion 64, and provided around the coolant flow field 34. A plurality of, e.g., three ridge members 68a and a plurality of, e.g., three ridge members 68b are formed integrally on the surface 18b of the second metal separator 18. The ridge members 68a are provided between the coolant supply passage 22a and the inlet buffer 56a, and the ridge members 68b are provided between the coolant discharge passage 22b and the outlet buffer 56b.

A plurality of, e.g., five ridge members 70a and a plurality of, e.g., five ridge members 70b are formed integrally on the surface 18b of the second metal separator 18. The ridge members 70a are provided between the coolant supply passage 22a and the inlet buffer 36a of the first metal separator 16, and the ridge members 70b are provided between the coolant discharge passage 22b and the outlet buffer 36b of the first metal separator 16. The ridge members 68a, 68b, 70a, and 70b form part of the second seal member 58, and contact the first seal member 40 under pressure to form an inlet connection channel 72a and an outlet connection channel 72b.

The coolant supply passage 22a is connected to the coolant flow field 34 through the inlet connection channel 72a, and the coolant discharge passage 22b is connected to the coolant flow field 34 through the outlet connection channel 72b. The inlet connection channel 72a include a plurality of first inlet bifurcated grooves 74a formed between the ridge members 68a, and a plurality of second inlet bifurcated grooves 76a formed between the ridge members 70a. The inlet connection channel 72a is bifurcated in at least two directions. The outlet connection channel 72b includes a plurality of first outlet bifurcated grooves 74b formed between the ridge members 68b, and a plurality of second outlet bifurcated grooves 76b formed between the ridge members 70b. The outlet connection channel 72b is bifurcated in at least two directions.

As shown in FIGS. 4 and 5, the ridge members 68a are overlapped with at least part 60a of the outer protrusion 60 as the seal member in the stacking direction, and the ridge members 68b are overlapped with at least part 60b of the outer protrusion 60 in the stacking direction. The ridge members 70a are overlapped with at least part 60c of the outer protrusion 60 in the stacking direction, and the ridge members 70b are overlapped with at least part 60d of the outer protrusion 60 in the stacking direction.

Figure 6:
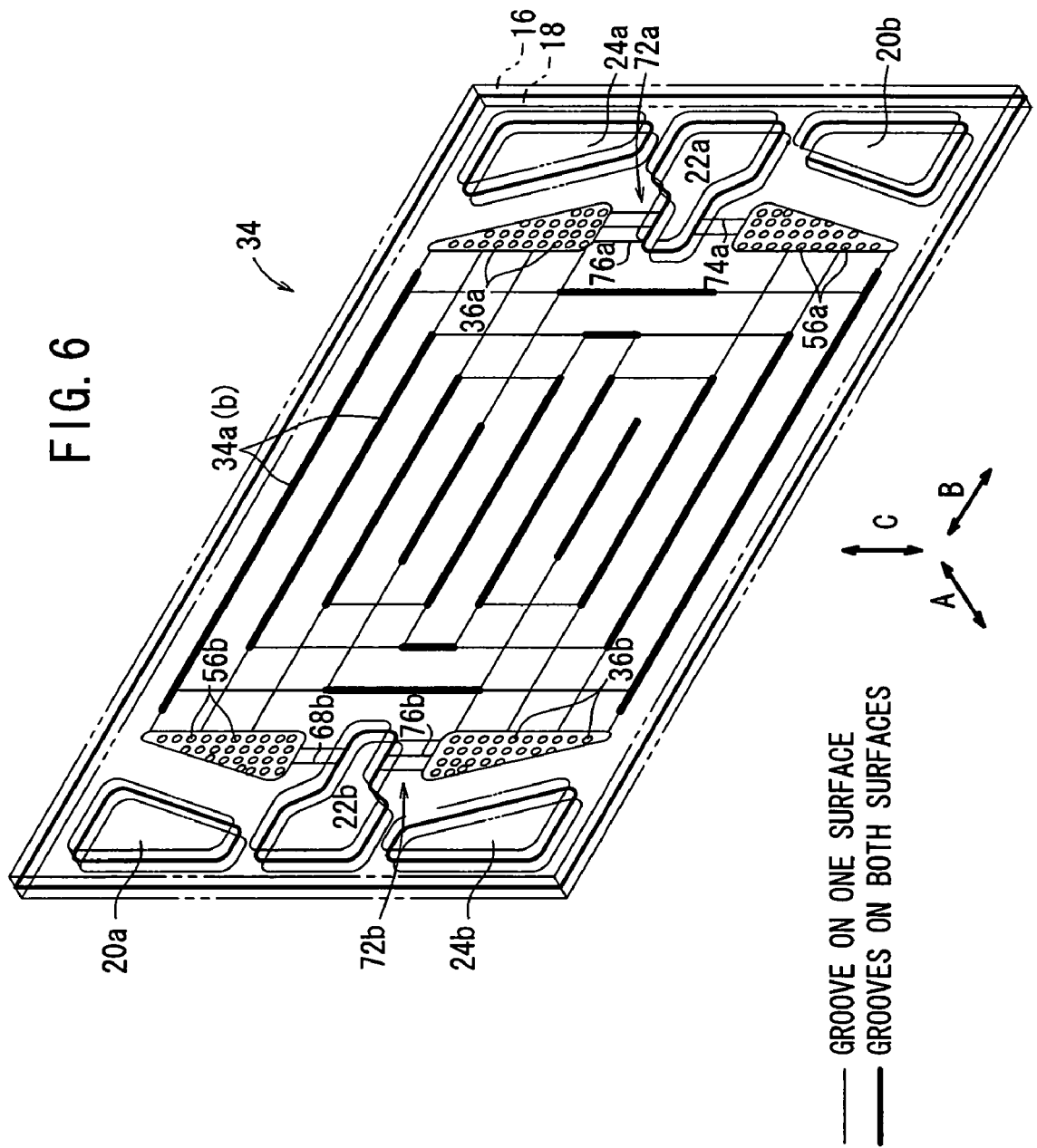
FIG. 6 is a perspective view showing a coolant flow field formed between the first and second metal separators.
Figure 7:
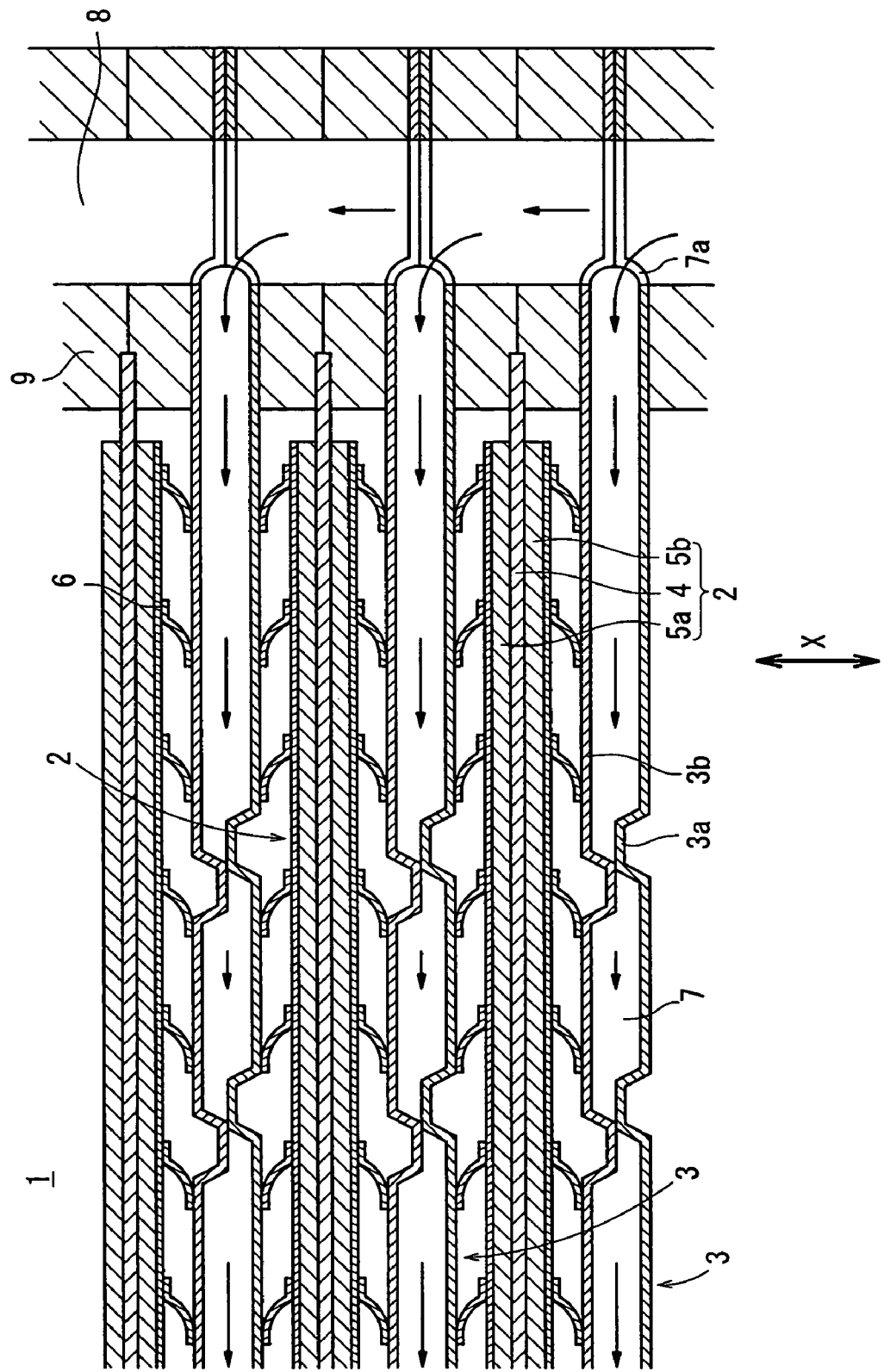
FIG. 7 is a cross sectional view showing part of a fuel cell block disclosed in Japanese Laid-Open Patent Publication No. 6-218275.

As shown in FIG. 6, when the first and second metal separators 16, 18 are stacked together, the grooves 34a and the grooves 34b form the coolant flow field 34. The coolant flow field 34 is connected to the coolant supply passage 22a from the inlet buffers 36a, 56a through the inlet connection channel 72a, and the coolant flow field 34 is connected to the coolant discharge passage 22b from the outlet buffers 36b, 56b through the outlet connection channel 72b.

As shown in FIG. 1, middle portions at opposite ends of the membrane electrode assembly 14 in the direction indicated by the arrow B are cut away. As shown in FIGS. 1 and 2, the membrane electrode assembly 14 comprises a cathode 82, an anode 84, and the solid polymer electrolyte membrane 80 interposed between the cathode 82 and the anode 84. The solid polymer electrolyte membrane 80 is formed by impregnating a thin membrane of perfluorosulfonic acid with water, for example. The surface area of the anode 84 is smaller than the surface area of the cathode 82.

Each of the cathode 82 and the anode 84 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the cathode 82 and the electrode catalyst layer of the anode 84 are fixed to both surfaces of the solid polymer electrolyte membrane 80, respectively.

Next, operation of the fuel cell 10 will be described below.

As shown in FIG. 1, a fuel gas such as a hydrogen-containing gas is supplied to the fuel gas supply passage 24a, and an oxygen-containing gas is supplied to the oxygen-containing gas supply passage 20a. Further, a coolant such as pure water, an ethylene glycol or an oil is supplied to the coolant supply passage 22a.

Therefore, as shown in FIGS. 1 and 4, the fuel gas from the fuel gas supply passage 24a flows from the surface 18b to the surface 18a through the inlet through holes 55a. The fuel gas flows through the inlet buffer 54a, and flows into the fuel gas flow field 50 of the second metal separator 18. The fuel gas flows back and forth in the direction indicated by the arrow B along the anode 84 of the membrane electrode assembly 14 for inducing an electrochemical reaction at the anode 84.

As shown in FIG. 1, the oxygen-containing gas from the oxygen-containing gas supply passage 20a flows through the inlet buffer 32a, and flows into the oxygen-containing gas flow field 26 of the first metal separator 16. The oxygen-containing gas flows back and forth in the direction indicated by the arrow B along the cathode 82 of the membrane electrode assembly 14 for inducing an electrochemical reaction at the cathode 82.

Thus, in the membrane electrode assembly 14, the fuel gas supplied to the anode 84, and the oxygen-containing gas supplied to the cathode 82 are consumed in the electrochemical reactions at catalyst layers of the anode 84 and the cathode 82 for generating electricity.

Then, the fuel gas supplied to, and consumed at the anode 84 flows from the outlet buffer 54b, and flows through the outlet through holes 55b toward the surface 18b. The fuel gas is discharged into the fuel gas discharge passage 24b in the direction indicated by the arrow A (see FIGS. 1 and 4). Likewise, the oxygen-containing gas supplied to, and consumed at the cathode 82 flows through the outlet buffer 32b, and the oxygen-containing gas is discharged into the oxygen-containing gas discharge passage 20b in the direction indicated by the arrow A (see FIG. 1).

Further, as shown in FIG. 6, the coolant supplied to the coolant supply passage 22a flows from the inlet connection channel 72a. The coolant flows through the inlet buffers 36a, 56a, and flows into the coolant flow field 34 between the first and second metal separators 16, 18. After the coolant is used for cooling the membrane electrode assembly 14, the coolant flows from the outlet connection channel 72b, and flows through the outlet buffers 36b, 56b, and is discharged into the coolant discharge passage 22b.

In the embodiment of the present invention, as shown in FIG. 5, the ridge members 68a, 68b, 70a, 70b are formed integrally on the second metal separator 18. These ridge members 68a, 68b, 70a, 70b contact the first seal member 40 of the first metal separator 16 under pressure to form the inlet connection channel 72a and the outlet connection channel 72b. Thus, with the simple structure, it is possible to reliably connect the coolant supply passage 22a and the coolant discharge passage 22b to the coolant flow field 34.

Therefore, the coolant flows smoothly and suitably between the coolant supply passage 22a and the coolant flow field 34, and between the coolant flow field 34 and the coolant discharge passage 22b regardless of the shapes of the oxygen-containing gas flow field 26 and the fuel gas flow field 50 formed on the first and second metal separators 16, 18.

Further, the ridge members 68a, 68b, 70a, 70b contact the first seal member 40 of the first metal separator 16. Thus, when a tightening load is applied to the fuel cell 10 in the stacking direction indicated by the arrow A, it is possible to effectively cool the power generation cell 12 without deformation of the inlet connection channel 72a and the outlet connection channel 72b.

Further, the ridge members 68a, 68b, 70a, 70b are overlapped with at least part 60a through 60d of the outer protrusion 60 as the seal member for preventing leakage in the membrane electrode assembly 14. Thus, a reaction force against the sealing load applied to the membrane electrode assembly 14 is generated, and it is possible to suitably maintain the sealing characteristics of the membrane electrode assembly 14 by the outer protrusion 60.

Further, the coolant supply passage 22a and the coolant discharge passage 22b are provided at middle positions of the opposite left and right ends of the power generation cell 12. The first and second bifurcated grooves 74a, 76a of the inlet connection channel 72a are connected to the coolant supply passage 22a, and the first and second bifurcated grooves 74b, 76b of the outlet connection channel 72b are connected to the coolant discharge passage 22b. Thus, it is possible to smoothly and reliably supply the coolant to the entire coolant flow field 34, and the cooling efficiency is improved in each of the power generation cells 12.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by stacking a plurality of power generation cells in a stacking direction, said power generation cells each including a membrane electrode assembly and a pair of metal separators sandwiching said membrane electrode assembly, said membrane electrode assembly including a pair of electrodes and an electrolyte membrane interposed between said electrodes, wherein a reactant gas passage and a coolant passage extend through said power generation cells in a stacking direction, and a coolant flow field for supplying a coolant is formed between metal separators of adjacent power generation cells, and wherein at least one of said metal separators has a protrusion formed of a seal member on a first surface facing said membrane electrode assembly, a portion of the protrusion extends lengthwise on the first surface in a direction along a length of the at least one of said metal separators, the at least one of said metal separators has a ridge member made of a sealing material formed integrally on a second surface opposite to said membrane electrode assembly, said ridge member forms a connection channel connecting said coolant flow field and said coolant passage and said ridge member extends lengthwise on the second surface in a direction along a width of the at least one of said metal separators, the connection channel including a plurality of bifurcated grooves provided at least at opposite sides of the coolant passage between said coolant passage and said coolant flow field, and said ridge member overlaps with the portion of said protrusion in the stacking direction.

2. A fuel cell according to claim 1, wherein said connection channel is formed between said ridge member and a planar seal member formed integrally on said metal separator facing said at least one of said metal separators.

3. A fuel cell according to claim 1, wherein a seal member is formed integrally on said at least one of metal separators around said coolant flow field; and said ridge member forms part of said seal member.

4. A fuel cell according to claim 1, wherein said power generation cells are stacked in a direction perpendicular to a gravity direction;

said reactant gas passage comprises a fuel gas supply passage, an oxygen-containing gas supply passage, a fuel gas discharge passage, and an oxygen-containing gas discharge passage;

said coolant passage comprises a coolant supply passage and a coolant discharge passage; and among said passages comprising said fuel gas supply passage, said oxygen-containing gas supply passage, said coolant supply passage, said fuel gas discharge passage, said oxygen-containing gas discharge passage, and said coolant discharge passage, three of said passages extend through a first end of said power generation cells, and the other three passages extend through a second end, opposite from and parallel to the first end, of said power generation cells, wherein the first end and the second end extend perpendicular to the stacking direction and said coolant supply passage and said coolant discharge passage extend through middle portions of the opposite left and right ends of said power generation cells.

5. A fuel cell according to claim 1, wherein the portion of the protrusion comprises an outer protrusion extending in the first direction and an inner protrusion extending in the first direction, and said ridge member extends in the second direction such that said ridge member overlaps with both of said inner protrusion and said outer protrusion in the stacking direction.

* * * * *